(12) United States Patent
Jain et al.

(10) Patent No.: US 12,102,120 B2
(45) Date of Patent: Oct. 1, 2024

(54) STORAGE CASE

(71) Applicant: NICOVENTURES HOLDINGS LIMITED, London (GB)

(72) Inventors: Siddhartha Jain, London (GB); Rory Fraser, London (GB); Steven Michael Schennum, London (GB); Thomas Michael McKeon, London (GB)

(73) Assignee: NICOVENTURES TRADING LIMITED, London (GB)

( * ) Notice: Subject to any disclaimer, the term of this patent is extended or adjusted under 35 U.S.C. 154(b) by 328 days.

(21) Appl. No.: 16/319,390

(22) PCT Filed: Jul. 17, 2017

(86) PCT No.: PCT/GB2017/052092
§ 371 (c)(1),
(2) Date: Jan. 21, 2019

(87) PCT Pub. No.: WO2018/015724
PCT Pub. Date: Jan. 25, 2018

(65) Prior Publication Data
US 2019/0216129 A1 Jul. 18, 2019

Related U.S. Application Data

(60) Provisional application No. 62/365,720, filed on Jul. 22, 2016.

(51) Int. Cl.
*A24F 15/01* (2020.01)
*A24F 40/10* (2020.01)
*A24F 40/95* (2020.01)

(52) U.S. Cl.
CPC .............. *A24F 15/01* (2020.01); *A24F 40/95* (2020.01); *A24F 40/10* (2020.01)

(58) Field of Classification Search
CPC ........ A24F 15/18; A24F 15/12; A24F 15/015; A24F 40/10; A24F 40/485
See application file for complete search history.

(56) References Cited

U.S. PATENT DOCUMENTS

| 2013/0146489 A1 | 6/2013 | Scatterday |
| 2013/0167854 A1* | 7/2013 | Shin ...................... A61M 15/06 131/329 |

(Continued)

FOREIGN PATENT DOCUMENTS

| CN | 101518361 A | 9/2009 |
| CN | 101756352 A | 6/2010 |

(Continued)

OTHER PUBLICATIONS

International Preliminary Report on Patentability for Application No. PCT/GB2017/052092, mailed on Sep. 19, 2018, 12 pages.

(Continued)

*Primary Examiner* — Michael H. Wilson
*Assistant Examiner* — Stephanie Lynn Moore
(74) *Attorney, Agent, or Firm* — Husch Blackwell (57) ABSTRACT

A storage case for an electronic vapor provision device component having a reservoir for source liquid, the case defining an interior storage volume and including a receiving volume configured to receive at least one such component within the case; and at least one sealing means configured to inhibit liquid held in such a component received in the receiving volume from flowing into the interior storage volume.

25 Claims, 7 Drawing Sheets

(56) References Cited

U.S. PATENT DOCUMENTS

| | | | |
|---|---|---|---|
| 2014/0014125 A1* | 1/2014 | Fernando | A24F 40/50 131/328 |
| 2014/0374289 A1 | 12/2014 | Liu | |
| 2015/0101945 A1 | 4/2015 | Scatterday | |
| 2015/0114409 A1* | 4/2015 | Brammer | A61M 11/007 131/329 |
| 2015/0208729 A1 | 7/2015 | Monsees et al. | |
| 2015/0245656 A1 | 9/2015 | Memari et al. | |
| 2015/0305464 A1 | 10/2015 | Nelson, Jr. et al. | |
| 2016/0099592 A1 | 4/2016 | Gatta et al. | |
| 2016/0150824 A1* | 6/2016 | Memari | H02J 7/35 131/329 |

FOREIGN PATENT DOCUMENTS

| | | | |
|---|---|---|---|
| CN | 105476073 A | 4/2016 | |
| EP | 2929903 A1 | 10/2015 | |
| GB | 2522395 A | 7/2015 | |
| GB | 2533135 A | 6/2016 | |
| JP | S6118147 U | 2/1986 | |
| JP | S6438991 U | 3/1989 | |
| JP | 3025442 U | 6/1996 | |
| WO | WO-2015028815 A1 | 3/2015 | |
| WO | WO-2015128667 A1 | 9/2015 | |
| WO | WO-2016107764 A2 | 7/2016 | |
| WO | WO-2016107764 A3 | 9/2016 | |

OTHER PUBLICATIONS

International Search Report and Written Opinion for Application No. PCT/GB2017/052092, mailed on Oct. 2, 2017, 9 pages.

Office Action For Japanese Application No. 2019-500538, mailed on Jan. 26, 2021, 5 pages.

Office Action mailed Sep. 30, 2019 for Russian Application No. 2019101581, 15 pages.

Written Opinion of the International Preliminary Examining Authority for Application No. PCT/GB2017/052092, mailed on Jun. 14, 2018, 6 pages.

* cited by examiner

STORAGE CASE

PRIORITY CLAIM

The present application is a National Phase entry of PCT Application No. PCT/GB2017/052092, filed Jul. 17, 2017, which claims priority from U.S. Provisional Application No. 62/265,720, filed Jul. 22, 2016, each of which is hereby fully incorporated herein by reference.

TECHNICAL FIELD

The present disclosure relates to storage cases for cartomizers, liquid cartridges and other liquid-holding components of electronic aerosol provision systems. The cases may be used for packaging, storage, carrying, transporting, holding and similar functions.

BACKGROUND

Aerosol/vapor provision systems such as e-cigarettes generally contain a reservoir of a source liquid containing a formulation, typically including nicotine, from which an aerosol is generated, such as through vaporization or other means. Thus an aerosol source for an aerosol provision system may comprise a heating element coupled to a portion of the source liquid from the reservoir. In some systems, the heating element and reservoir are comprised within a first section which is connectable to a second section housing a battery to provide electrical power to the heating element. This first section may be referred to as a cartomizer, and can be disposable to be replaced when the source liquid has been consumed. In use, a user inhales on the device to activate the heating element which vaporizes a small amount of the source liquid, which is thus converted to an aerosol for inhalation by the user. More particularly, such devices are usually provided with one or more air inlet holes located away from a mouthpiece of the system. When a user sucks on the mouthpiece, air is drawn through the inlet holes and past the aerosol source. There is an air flow path through the cartomizer connecting the inlet holes to the aerosol source and on to an opening in the mouthpiece so that air drawn past the aerosol source continues along the flow path to the mouthpiece opening, carrying some of the aerosol from the aerosol source with it. The aerosol-carrying air exits the aerosol provision system through the mouthpiece opening for inhalation by the user.

The requirement for the aerosol source to access both the source liquid and air flowing through the air flow path so that aerosol can be delivered into the air flow results in a potential for unvaporized source liquid to find its way into the air flow path. This liquid may then leak from the cartomizer through the inlet or outlet of the airflow path. Approaches to mitigating this leakage are of interest.

SUMMARY

According to a first aspect of certain embodiments described herein, there is provided a storage case for an electronic vapor provision device component having a reservoir for source liquid, the case defining an interior storage volume and comprising: a receiving volume configured to receive at least one such component within the case; and at least one sealing means configured to inhibit liquid held in such a component received in the receiving volume from flowing into the interior storage volume.

The component may be a cartomizer, or may be a source liquid cartridge for insertion into a cartomizer, for example.

The at least one sealing means may comprise a surface feature on an interior surface of the case configured to engage with a portion of a component including an air path aperture to inhibit the egress of liquid from the air path aperture. For example, the surface feature may comprise a protrusion configured to extend into an air path aperture when engaged with the component portion, or the surface feature may comprise a protrusion configured to cover an air path aperture when engaged with the component portion, or the surface feature may comprise a collar configured to engage a perimeter of the component portion around the air path aperture. The protrusion may be formed as an outer wall or ridge defining a central region of space, for example, a collar which engages an inner perimeter of the component portion around the air path aperture.

In the latter situation, the surface feature may be a recess in the interior surface of the case, a wall of the recess forming the collar, or the surface feature may be a collar formation protruding from the interior surface of the case.

The surface feature may be configured to be elastically deformable to provide a friction or compression fit with or against the component portion.

Alternatively, the surface feature may comprise a screw thread configured to engage with a cooperating screw thread on the component.

The at least one sealing means may comprise a first sealing means configured to engage a portion of the cartomizer including an air inlet of the cartomizer and a second sealing means configured to engage a portion of the component including an air outlet of the component.

In some embodiments, the receiving volume occupies substantially the whole of the interior storage volume. In other embodiments, the interior storage volume includes the receiving volume.

Alternatively, the receiving volume may be adjacent to the interior storage volume. The at least one sealing means may comprise a cover for closing the receiving volume and separating it from the interior storage volume. The cover may be retainable in a closed position to close the receiving volume by a friction fit, a screw thread connection or a magnetic attachment with a rim of an access aperture of the receiving volume.

In some embodiments, the interior storage volume may be configured to accommodate at least one battery section of an electronic vapor provision device. The case may then further comprise an electrical connection to connect an accommodated battery section to a charging device. The charging device may be integral with the storage case.

The case may comprise a first section and a second section connectable together by a closure arrangement so as to define the interior storage volume.

According to a second aspect of certain embodiments, there is provided a storage case according to the first aspect that further comprises at least one component received in the receiving volume.

According to a third aspect of certain embodiments provided herein, there is provided a case for storing an aerosol source cartridge assembly for use in a vapor provision device, the case comprising a lid section and a body section which cooperate to define an interior volume for enclosing at least one cartomizer, and at least one three-dimensional sealing component located on an inner surface of the case and configured to engage into, against or around an air path aperture of a cartomizer received in the interior volume.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a storage case may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) aerosol provision systems, such as e-cigarettes. Throughout the following description the term "e-cigarette" may sometimes be used; however, it will be appreciated this term may be used interchangeably with aerosol (vapor) provision system or device.

Figure 1:
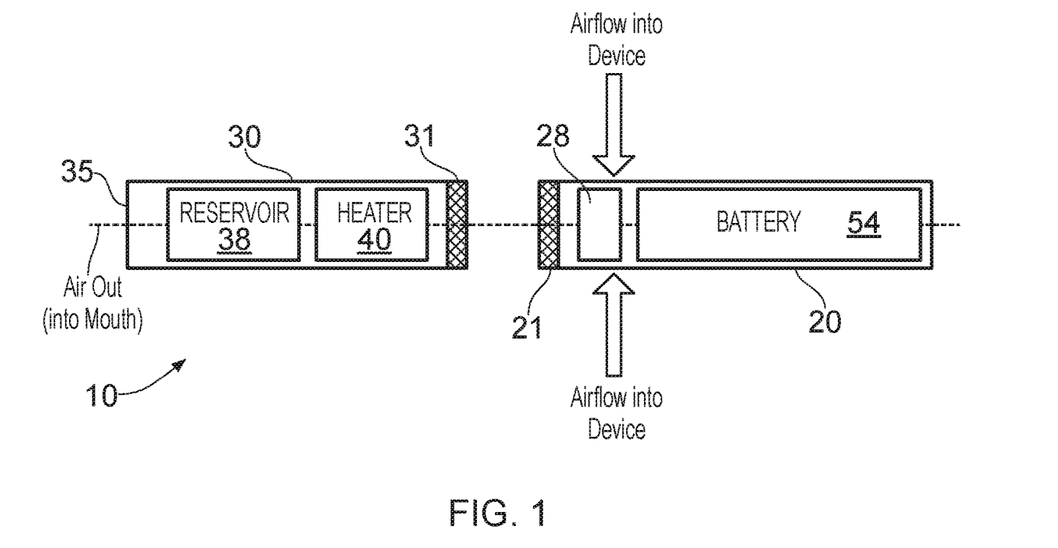
FIG. 1 shows a simplified schematic cross-sectional view of an electronic cigarette or vapor provision device.

FIG. 1 is a highly schematic diagram (not to scale) of an aerosol/vapor provision system such as an e-cigarette 10 to which some embodiments are applicable. The e-cigarette has a generally cylindrical shape, extending along a longitudinal axis indicated by dashed line, and comprises two main components, namely a body 20 and a cartridge assembly 30.

The cartridge assembly 30 includes a reservoir 38 containing a source liquid comprising a liquid formulation from which an aerosol is to be generated, for example containing nicotine, and an atomizer or heater 40 for generating the aerosol, for example by heating the source liquid. The source liquid and the heater/atomizer 40 may be collectively referred to as an aerosol source. The cartridge assembly 30 further includes a mouthpiece 35 having an opening (not shown) through which a user may inhale the aerosol generated by the heating element 40. The source liquid may comprise around 1 to 3% nicotine and 50% glycerol, with the remainder comprising roughly equal measures of water and propylene glycol, and possibly also comprising other components, such as flavorings. The body 20 includes a re-chargeable cell or battery 54 (referred to herein after as a battery) to provide power for the e-cigarette 10, and a printed circuit board (PCB) 28 and/or other electronics for generally controlling the e-cigarette 10. In use, when the heating element 40 receives power from the battery 54, as controlled by the circuit board 28 in response to pressure changes detected by an air pressure sensor (not shown), the heating element 40 vaporizes source liquid at the heating location to generate the aerosol, and this is then inhaled by a user through the opening in the mouthpiece 35. The aerosol is carried from the aerosol source to the mouthpiece 35 along an air channel (not shown) that connects the aerosol source to the mouthpiece opening as a user inhales on the mouthpiece 35.

In this particular example, the body 20 and cartridge assembly 30 are detachable from one another by separation in a direction parallel to the longitudinal axis, as shown in FIG. 1, but are joined together when the device 10 is in use by cooperating engagement elements 21, 31 (for example, a screw or bayonet fitting) to provide mechanical and electrical connectivity between the body 20 and the cartridge assembly 30. An electrical connector interface on the body 20 used to connect to the cartridge assembly 30 may also serve as an interface for connecting the body 20 to a charging device (not shown) when the body 20 is detached from the cartridge assembly 30. The other end of the charging device can be plugged into an external power supply, for example a USB socket, to charge or to re-charge the battery 54 in the body 20 of the e-cigarette 10. In other implementations, a separate charging interface may be provided, for example so the battery 54 can be charged when still connected to the cartridge assembly 30.

The e-cigarette 10 is provided with one or more holes (not shown in FIG. 1) for air intake. These holes, which are in an outer wall of the body 20 or the cartridge assembly 30, connect to an airflow path through the cartridge assembly 30 to the mouthpiece 35. In some examples, the air flow path includes a pressure sensing region (not shown in FIG. 1) in the body 20, and then connects from the body 20 into the cartridge assembly 30 to a region around the heating element 40 so that when a user inhales through the mouthpiece 35, air is drawn into the airflow path through the one or more air inlet holes. This airflow (or the resulting change in pressure) is detected by a pressure sensor (not shown in FIG. 1) in communication with the airflow path that in turn activates the heating element 40 (via operation of the circuit board 28) to vaporize a portion of the source liquid to generate the aerosol. The airflow passes through the airflow path, and combines with the vapor in the region around the heating element 40 and the resulting aerosol (combination of airflow and condensed vapor) travels along the airflow path connecting from the region of the heating element 40 to the mouthpiece 35 to be inhaled by a user.

The detachable cartridge assembly 30 may be disposed of when the supply of source liquid is exhausted, and replaced with another cartridge assembly if so desired. The body 20 may be intended to be reusable, for example to provide operation for a year or more by connection to a series of disposable detachable cartridge assemblies.

Figure 2:
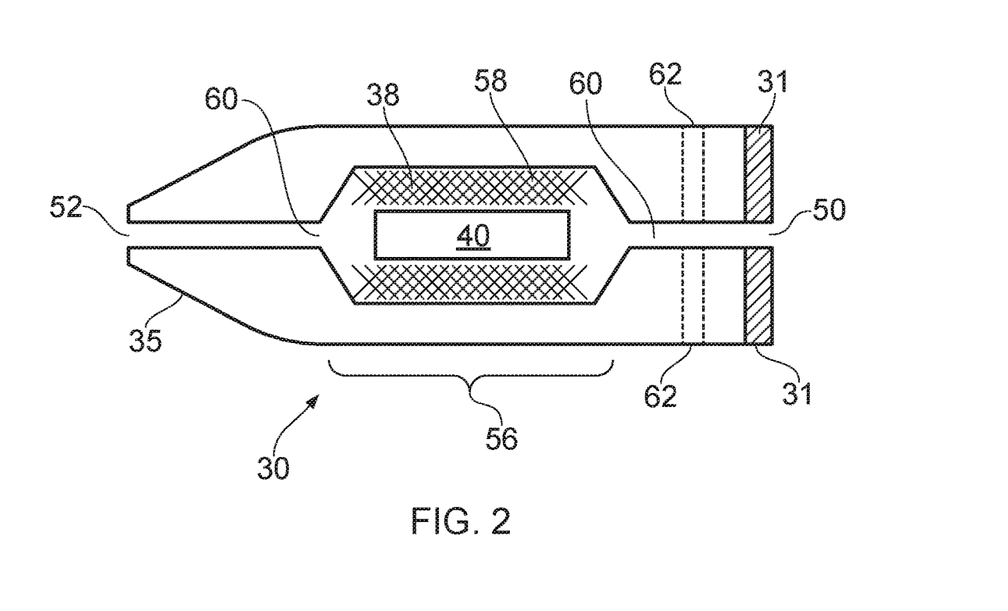
FIG. 2 shows a simplified cross-sectional view of a cartridge assembly of an electronic cigarette.

FIG. 2 shows a schematic representation of an example cartridge assembly 30 in more detail. An air flow path 60 runs along the longitudinal axis, from an inlet 50 at the end connectable to the body 20 (via the engagement element 31) to an outlet 52 at the mouthpiece 35. Note that the initial air intake for the system, being the external point at which air is drawn into the device from the environment, may be in the body 20, at the joint between the body 20 and the cartridge assembly 30, or in the cartridge assembly 30 itself (62, shown in phantom in FIG. 2 in an example position only; other positions are possible). For the purpose of the present disclosure, the feature of interest is the opening or openings by which air enters the cartridge assembly 30; this may or may not be the initial external air intake in the final assembled system. This opening will be referred to in the following description as the "air inlet" (and may comprise more than one aperture).

In this example, the mouthpiece 35 is shown as being integrally formed with the cartridge assembly 30, so that the air outlet 52 of the cartridge assembly 30 is the outlet of the mouthpiece 35. In other examples, the mouthpiece 35 may be removable and will form an extension to the air outlet 52 to provide a final external outlet through which the user inhales. For the purpose of the present invention, the term "air outlet" is used to refer to any of the various options for the outlet: an integral mouthpiece, or the outlet of a removable mouthpiece in place on the cartridge assembly, or the outlet of the cartridge assembly to which a mouthpiece can be connected.

The air inlet into the cartridge assembly 30 and the air outlet 52 out of the cartridge assembly 30 can collectively be termed "air path apertures".

Regardless of the nature and position of the air inlet and the air outlet 52, these two features form opposite ends of an air flow path (air path) 60 running through the cartridge assembly 30. An intermediate point along the airflow path 60 houses an aerosol source 56 comprising a heater or atomizer 40 and a reservoir 38. In this example the air flow path 60 is widened to accommodate the aerosol source 56; other configurations are not precluded, and the air flow path 60 need not be straight, nor centrally disposed within the cartridge assembly 30, and one or more components of the aerosol source may be differently or more remotely located with respect to the air flow path 60. The heater 40 has electrical connections (not shown) to a battery in a body section 20 of the e-cigarette 10, and is surrounded by the reservoir 38 of source liquid. In this example, the reservoir 38 comprises a volume of porous material 58 (such as a mesh, fiber wadding, or porous ceramic) which holds the source liquid in its pores and brings it into contact with the heater 40 for vaporization. In some devices, a separate store of source liquid may feed the porous material, thereby extending the capacity of the reservoir 38. In some devices, the heater 40 itself may be formed from porous conductive material and act to hold at least some of the source liquid. In some devices, the source liquid may be held free-flowing in a tank or similar storage volume in liquid communication (via a wick or other porous fluid path) with a heater. Many configurations of aerosol source are known and are within the scope of the present disclosure, which does not depend on features of the aerosol source.

Cartridge assemblies of this type, including an atomizer and in which a moderate volume of source liquid is provided in a reservoir (which may or may not be wholly or partly formed from a porous substrate), can be called "cartomizers". Cartomizers may or may not allow the user to refill the reservoir; sometimes the cartomizer is intended to be disposable once the source liquid is used up. Other configurations of cartridge assembly comprising an aerosol source detachable from a battery or power source section are sometimes referred as "clearomizers". A clearomizer typically includes a relatively large tank, often but not always configured to allow the user to fill or refill it with his choice of source liquid. The source liquid is then transported to a heater via one or more wicks. Generally, however, the cartridge assembly will include an air flow path extending via an aerosol source between an air inlet and an air outlet, although other air flow paths are known.

For simplicity and conciseness, the term "cartomizer" will be used in the present application, and should be understood to also include cartridge assemblies configured as clearomizers, and other configurations having an aerosol source located in or in communication with an air flow path between an air inlet and an air outlet. The air inlet may comprise one or more apertures or openings in a side wall or end wall of the assembly, or proximate the mouth piece. The cartomizer may have any external shape and size, and be configured to couple to a body section housing a battery in any convenient manner including a linear arrangement as in FIG. 1 (which need not be elongate in shape) or a side-by-side arrangement.

As can be appreciated from FIG. 2, the cartomizer configuration can be vulnerable to leakage of the source liquid out of the cartomizer, because the source liquid has to be in fluid communication with the air flow path so that the aerosol formed at the heater can be delivered into the air flow for inhalation. Leakage can occur through the air inlet or the air outlet. A manufacturer may use specialist packaging to control leakage during supply to the consumer, but the consumer may wish to remove such packaging on receipt of the goods but prior to use, for example if multiple cartomizers are provided in a single pack. Also, a user may wish to switch to a different source liquid (having a different nicotine percentage or a different flavorant, for example) before the cartomizer is empty. This is particularly relevant to disposable cartomizers which are not configured for a user to add or remove source liquid. In such a case, the user may be reluctant to waste source liquid by disposing of a part-used cartomizer, and will prefer to store the cartomizer for future consumption of the remaining source liquid.

Embodiments of the present disclosure are directed to the storage of cartomizers in a manner which reduces or inhibits leakage of the source liquid. Several configurations are considered. The invention is not limited to any particular configuration of cartomizer or electronic cigarette, but rather is generally applicable to components of vapor provision systems which contain a source liquid and are vulnerable to potential leakage of that liquid from apertures of an air flow path. It is proposed that, to inhibit leakage, one or more cartomizers may be stored in a storage case. This includes storage before, during and/or after receipt of the cartomizer by a consumer. Hence, in some examples, a case comprises packaging for supply of a cartomizer to the consumer, who may continue to use the packaging for subsequent storage of the cartomizer, or in other examples a case comprises packaging for retail/supply purposes only so that a consumer discards the case before use of the cartomizer, or in still other examples a case comprises storage for a cartomizer after supply to the consumer in a possibly different container. Accordingly, cases according to various examples may be intended to be disposable (for packaging only), reusable by the consumer for storage after supply in the same case, or intended for long-term storage use distinct from the original packaging.

In the following, the term "storage case" is used for all these various scenarios, and hence includes cases or containers designed, configured and intended for packaging and non-packaging purposes. In various examples, the case has an interior storage volume, for example defined by a lid section and a body section which can be secured together, and a cartomizer is held in a receiving volume, which may or may not be coterminous with the storage volume. Various sealing configurations are proposed to retain cartomizer source liquid and inhibit it from flowing into the storage volume. In some examples the sealing function is provided by formations on the interior surface of the case to which a cartomizer can be attached or aligned, such as by a push fit, to cover or block either or both of the air inlet or the air outlet. Alternatively, closing the lid might bring the formation into engagement with air apertures of a cartomizer that has been placed in the receiving volume. The receiving volume might occupy the entirety of the storage volume, so that the case holds one or more cartomizers only. Alternatively, the storage volume might include the receiving volume but be larger, so providing room for storing other components such as a battery section of an e-cigarette. As an alternative, the receiving volume may be a separate compartment accessible from the storage volume, and provided with a cover or barrier, which, when in a closed position to close the receiving volume, provides a sealing effect between the two volumes so that any liquid leaking from a cartomizer in the receiving volume is inhibited from entering the storage volume. Items kept in the storage volume, such as a battery section, are thus protected from liquid exposure. Capability for charging the battery may be provided in cases configured to hold a battery section; this may be by connection to a power source integrated into the case (to allow roaming charging) or by connection of the case to a fixed power source.

Furthermore, in some examples a storage case may be configured for the storage of one or more cartridges each comprising a reservoir of source liquid, where the cartridge is intended for insertion into a cartomizer without an integral reservoir, so that the reservoir of the cartridge is brought into operating conjunction with the cartomizer's atomizer. Similar leakage problems may arise with such a liquid cartridge as with a cartomizer incorporating a reservoir. Consequently, a storage case may be for the storage of any component for a vapor provision device where the component includes a reservoir for the storage of source liquid. The component may be a cartomizer, a liquid cartridge for use with a cartomizer, or any other similar reservoir-based component. In the following description, features relating to the sealing configurations and storage cases are applicable to any such component, and are not limited to cartomizers. Some description is presented with reference to cartomizers; this is for brevity only and is not intended as limiting. Any reference to cartomizers should be understood as applicable also to other components having a reservoir, except where clearly incompatible.

Figure 3:
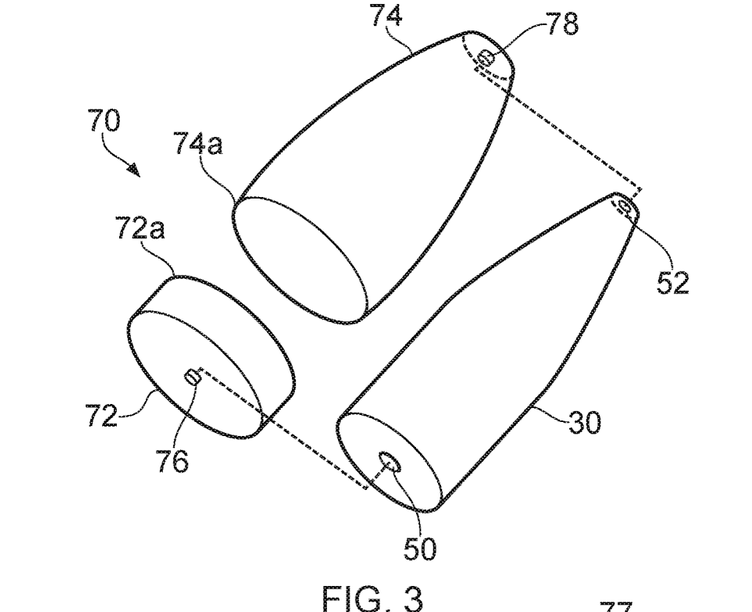
FIG. 3 shows a perspective view of an example storage case and cartomizer that may be stored in the case.

FIG. 3 shows a perspective view of a first embodiment of a case 70, configured to house a cartomizer 30. In this example the case 70 is configured to receive a single cartomizer, without storage space for other items. The case 70 is shaped so that its interior space corresponds closely to the outer dimensions of the cartomizer, but this is not essential. Also, the outer shapes of the case 70 and the cartomizer 30 are merely examples, and may be any shape; the disclosure is not limited in this regard.

The case 70 comprises a first section 72 and a second section 74 which can be coupled or connected together to close the case and define a storage volume being the interior volume of the case 70. In this example the first section 72 is smaller than the second section 74 so may be considered as a lid section. In other configurations, the second section 74 might be a smaller lid section, or the two sections may be similarly sized, dividing the case 70 approximately in half so that neither section is obviously a lid portion. The first section 72 and the second section 74 engage together at joining portions 72a, 74a defined at the adjacent edges or rims of openings of the sections. Engagement may be by any suitable closure arrangement, such as a screw thread (if the case has a cylindrical cross-section at this point), or a snap fit of cooperating protrusions and recesses on the joining portions 72a, 74a, or by a friction fit as the two sections 72, 74 are pushed together, or any other suitable closure means configured to connect and secure the sections in a closed configuration. The joining sections 72a, 74a may or may not be configured to achieve a substantially leak-proof (watertight) seal when they are engaged together. A seal may be achieved by suitable shaping of a friction fit closure, or by compression of a rubber flange or washer or similar sealing member (not shown) arranged at the junction of the two joining portions 72a, 74a, for example. In this example the two sections 72, 74 join and separate in a plane that is substantially orthogonal to the longitudinal axes of the case 70 and of the cartomizer 30 when in the case, but other examples may be configured for joining and separation in a plane that is substantially parallel to the longitudinal axis, or in any plane between the orthogonal and parallel options.

To provide a leak-inhibiting functionality proposed by the disclosure, this example case 70 comprises two sealing means or components. A first sealing means 76 is arranged inside the first section 72 and a second sealing means 78 is arranged inside the second section 74. Each sealing means 76, 78 is configured as a shaped, three-dimensional surface feature on an inside surface of the relevant section 72, 74 of the case 70. In this example, the sealing means 76, 78 each comprise a protrusion extending inwardly into the case interior. Each protrusion is shaped and sized to fit into an air path aperture on the cartomizer 30, and positioned within the case such that when the cartomizer 30 is placed inside the case 70 and the lid section 72 is closed, the protrusions are aligned so as to extend into the air path apertures. This is indicated by the dotted lines in FIG. 3. In this example, the cartomizer 30 is elongate and has an air inlet 50 at one end and an air outlet at the opposite end, aligned substantially with the longitudinal axis of the cartomizer 30. To engage these apertures, the sealing means 76, 78 are disposed respectively on opposite facing interior end walls of the case 70.

In this example, the sealing means in the form of protrusions 76, 78 have a substantially cylindrical shape with a circular cross-section, to engage into the substantially cylindrical apertures on the cartomizer 30. Other cross-sectional shapes may be used, depending on the shapes of the air path apertures on a cartomizer of interest.

To provide an effective seal and maximize the leak-inhibiting effect, the surface features can be formed from a resilient material such as foam, rubber, cork or the like, and sized so as to provide a close friction fit into the air path apertures. The protrusions 76, 78 will thereby have an elastically deformable property, and under applied pressure can be compressed when fitted into the air path apertures 50, 52. The protrusions 76, 78 may also or alternatively have surface flanges to provide some deformation. The apertures 50, 52 will then be plugged closely, and leakage of fluid out from the cartomizer interior will be unlikely. To aid in engaging the protrusions into the apertures, the protrusions may have a tapering shape, so that their cross-sectional area and width is less at the end remote from the case surface compared to proximate the case surface.

A tight, friction fit is not essential, however, and some leak inhibition or reduction can be achieved with surface features which fill or block the apertures less closely. This is particularly relevant in configurations in which the two sections 72, 74 of the case press against the cartomizer ends when the case 70 is closed; this contact will provide some sealing function also. In such examples, the protrusions might not be made from a deformable material, and may instead be substantially rigid, such as made from metal or a hard plastics material.

In all examples, the surface features may be formed integrally with at least part of the relevant section 72, 74 of the case 70, such as by molding, or may be formed separately and fastened to the interior surface of the case by any appropriate technique such as adhesive, a screw or rivet, or welding.

Figure 4:
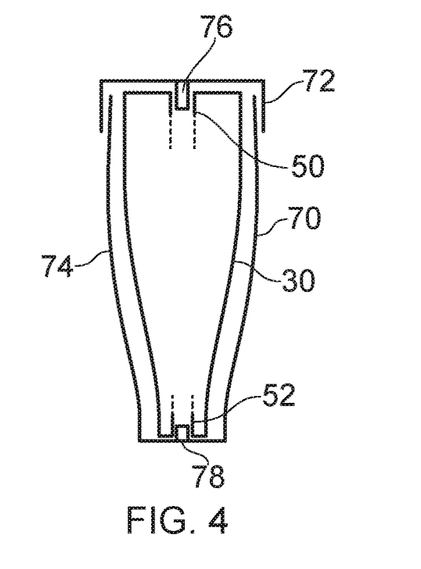
FIG. 4 shows a cross-sectional view through the case and the cartomizer of FIG. 3.

FIG. 4 shows a cross-sectional view of the case 70 storing the cartomizer 30 of FIG. 3. The cartomizer 30 is placed into the second section 74 of the case 70 via the section opening and pushed inwards so that the protruding sealing means 78 enters the air inlet 52, providing at least partial closure of the aperture. The first section 72, having a lid configuration, has been engaged with the second section 74 to close the container. Placing the lid 72 onto the case 70 has brought the other protruding sealing means 76 into engagement with the air outlet 50 so that it too is closed or sealed. In this manner, liquid inside the cartomizer 30 is inhibited from flowing out of the cartomizer 30 via the air flow path and leaking into the interior volume of the case 70.

The embodiment of FIGS. 3 and 4 has two sealing means, one for each of the two air path apertures (air inlet and air outlet). This is not essential however, and other example cases may be configured to provide a sealing means for only one of the air inlet and the air outlet of a cartomizer. Some protection against leakage will still be provided by such an arrangement. Some designs of cartomizer may be configured such that possible leakage is more likely from one aperture than the other, and a sealing means might be provided for this aperture only. Also, a case might be configured such that it is expected to be maintained in a position in which the air flow path of a stored cartomizer is substantially vertical so that gravity will inhibit leakage from an aperture at the upper end of the stored cartomizer, while a sealing means can be provided to protect the aperture at the lower end.

Figure 5:
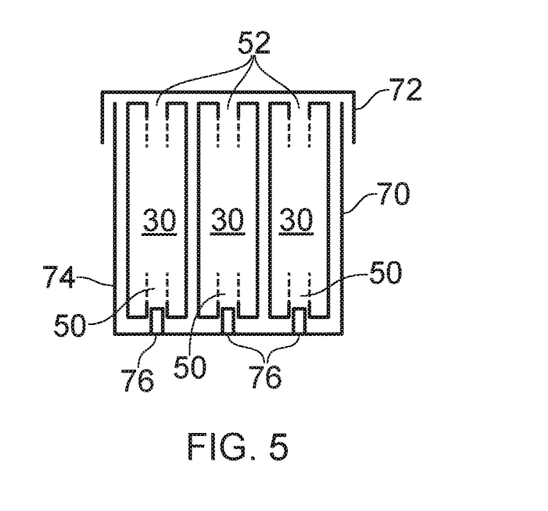
FIG. 5 shows a cross-sectional view through a further example storage case.

FIG. 5 shows a cross-sectional view of an example case 70 configured to receive more than one cartomizer; three in this example. A sealing means for each cartomizer is provided in a base section of the case 70, to which the air inlets of the cartomizers can be engaged for leak protection. No sealing means for the air outlets are provided in this example, so the lid section 72 can be attached to close the case 70 without any need to align surface feature sealing means with air apertures. A closely fitting lid section which contacts and possibly presses against the end surfaces of the cartomizers may aid in inhibiting leakage from the air outlets in such a configuration. For example, a catch, latch or similar engaging mechanism might be provided which when closed holds the lid in a shut position in which it presses tightly against the cartomizers, the catch acting to maintain this compression. A case may be sized to receive and hold any number of cartomizers as desired.

The examples of FIGS. 3, 4 and 5 comprise sealing means in the form of a protrusion that extends into an air path aperture, to define a plug that at least partly blocks or closes the aperture. Other shapes of surface feature are also contemplated. For example, the surface feature may be a surface protrusion shaped and sized to cover the air path aperture, rather than extend into it.

Figure 5A:
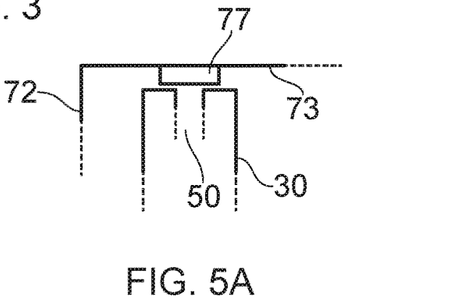
FIG. 5a shows a cross-sectional view through a part of a storage case according to a further example having an alternative sealing means.

FIG. 5A shows an example of a sealing means configured in this way, illustrated as a cross-section of part of a case containing a cartomizer. The first section 72 of the case has a surface protrusion 77 extending inwardly from the inner surface 73 into the interior volume of the case that will be occupied by the cartomizer 30. The surface protrusion 77 has a width (in all directions) which exceeds the width in the corresponding direction of the air path aperture 50 in the end of the cartomizer 30. When the first section 72 is closed with respect to the second section of the case (not shown), the protrusion 77 covers the air path aperture 50 and provides a sealing effect to inhibit leakage. The seal will be enhanced if the case is configured such that the protrusion 77 is pressed against the end surface (the upper end in the depicted orientation) of the cartomizer 30 when the case is closed, and if the protrusion 77 is made from a resilient compressible material, such as rubber, foam or cork. The surface protrusion may be positioned and arranged to cover and possibly press against an air path aperture in any external location on the cartomizer surface; the aperture need not be in an end surface of the cartomizer. A case may include one or two such surface features for any number of cartomizers.

In alternative examples, the surface feature may be in the form of a collar or surrounding wall defined on an interior surface of the case, into which an end (or other part) of a cartomizer which includes an air path aperture can be inserted. This provides a sealing effect more akin to a cap closure, in contrast to the plug closure offered by the protrusions in the FIGS. 3, 4 and 5 examples.

Figure 6A:
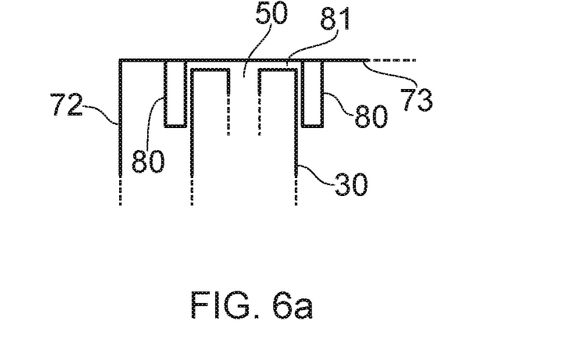
FIGS. 6a and 6b show a cross-sectional view and a plan view of a part of a storage case according to another example with an alternative sealing means.

FIG. 6a shows a first example of a sealing means configured in a collar format, illustrated as a cross-section of part of a case holding a cartomizer. The first section 72 of the case has a collar 80 extending inwardly into the case's interior from an inner surface or wall 73. The collar 80 protrudes from the inner surface in the form of a wall (annular or other closed or partially closed shape), surrounding and defining a central recess 81. The width or diameter and cross-section of the recess 81 are selected to substantially match the corresponding shape and dimensions of the end of a cartomizer 30, where that end has or includes an air path aperture 50. The end portion of the cartomizer 30 can be pushed into the recess 81 so that the collar 80 engages around the perimeter of the cartomizer 30 and forms a closure over the cartomizer end so the liquid egress from the air path aperture 50 is inhibited. Leakage into the interior volume of the case is thereby reduced or prevented.

Figure 6B:
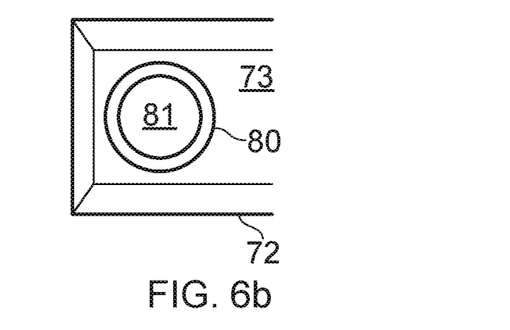

FIG. 6b shows a plan view looking into the interior of the first section 72. The collar 80 has a circular shape in this example, so that the recess 81 is round. This can be used in cooperation with a cartomizer of circular cross-section (at least at an end). Other collar shapes can be formed as appropriate, depending on the shape and size of the intended cartomizer.

Figure 7A:
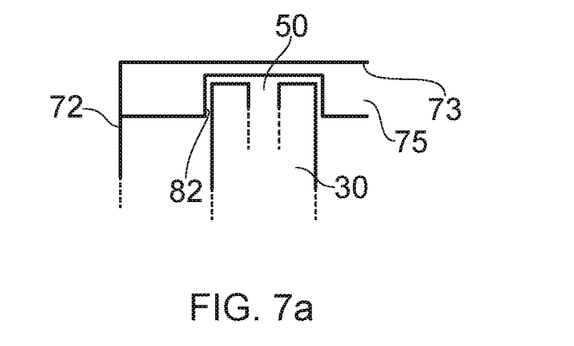
FIGS. 7a and 7b show a cross-sectional view and a plan view of a part of a storage case according to yet another example with an alternative sealing means.

FIG. 7a shows a second example of a collar format sealing means, which differs in its formation from the FIGS. 6a and 6b example, but functions in a similar manner. In this example, the protruding wall is replaced by a recess 82 formed in the inner surface 73 of the case. This can be fabricated by cutting, stamping or molding an inner liner layer of material 75 which is secured against the inner surface 73, or by molding the section of the case accordingly as a single piece. The side wall(s) of the recess engage around the perimeter of a cartomizer end.

Figure 7B:
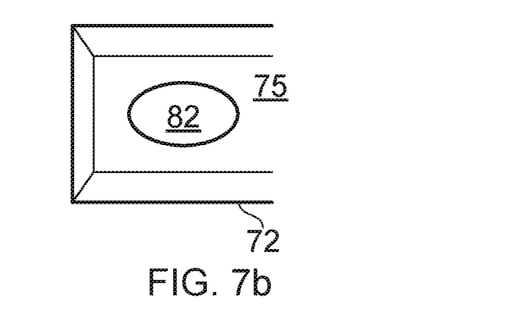

FIG. 7b shows a plan view of this example, looking into the interior of the first section 72. The recess 82 is oval, but may be any shape and size as required to engage with a cartomizer.

The collar formation (recess or protruding wall) may be formed from a resilient material so that the cartomizer is held in the collar by a friction fit; the material will deform slightly when the relevant portion of the cartomizer is inserted into the recess and elastically grip the cartomizer in place. Alternatively or additionally, one or more deformable flanges may be provided on the side wall(s) of the recess to grip the cartomizer. The side wall may be made tapering (so that the outer aperture of the recess, proximate the interior of the case, is larger than the base of the recess closest to the case wall) to aid with insertion of the cartomizer into the recess. More rigid material may alternatively be used, with the degree of sealing achieved depending on the closeness of fit between the inner wall of the recess and the outer surface of the engaged cartomizer portion, and the amount of contact between the end wall of the cartomizer and the base of the recess (which may be increased by configuring the case when closed to press the cartomizer against the inner surface 73, for example).

As with the earlier examples, a case having collar sealing means may be configured to receive one or more than one cartomizer. Also, a collar sealing means can be provided for one or both air path apertures on the cartomizer. For example, one collar may be formed on an interior surface of a first section of the case and another collar on an opposite facing interior surface of a second section of the case, for a cartomizer having air path apertures at opposite ends such as the example of FIG. 3.

Figure 8:
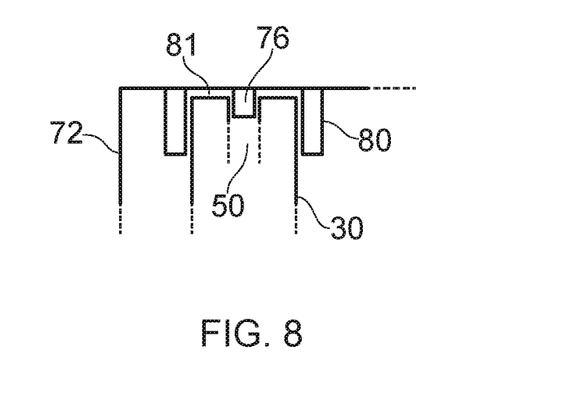
FIG. 8 shows a cross-sectional view of part of a storage case according to a further example with an alternative sealing component.

Furthermore, a surface feature sealing means may be configured as a combined cap and plug arrangement, having a collar surrounding a protrusion. FIG. 8 shows an example of such a sealing means, in a cross-section of part of a case.

As an alternative to surface feature sealing means that engage with the cartomizer via a pushing or inserting movement ("push-fit" sealing means), one can make use of screw threads provided on certain cartomizers to connect the cartomizer with a battery section of an electronic cigarette. If the air inlet into the cartomizer is encompassed by the screw thread, then screwing the screw thread onto a cooperating screw thread on an inner surface of the case will provide some sealing effect and protection against leakage from the air inlet. A "push-fit" surface feature sealing means such as those discussed above may additionally be provided to seal or cover the air outlet, if desired.

Figure 9A:
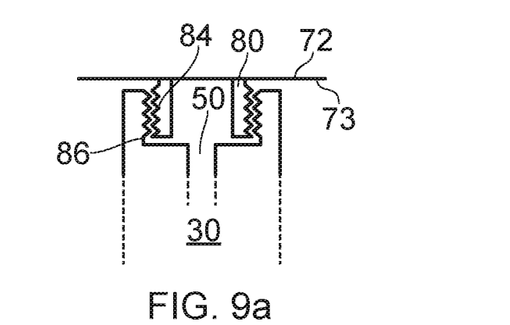
FIGS. 9a and 9b show cross-sectional views of a part of storage cases according to examples having a sealing component comprising a screw thread.
Figure 9B:
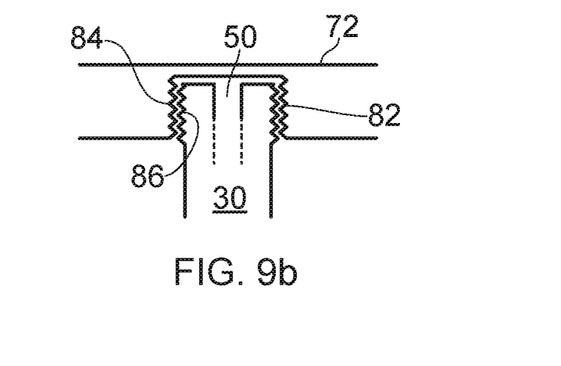

FIG. 9a shows a cross-sectional view of a first example of a screw thread sealing means, in which a screw thread 84 is provided on an outer side surface of a collar or pedestal 80 protruding from an inside surface of the case, to engage with an inwardly facing screw thread 86 on a cartomizer 30. FIG. 9b shows a cross-sectional view of an alternative example, in which the screw thread 84 is provided on an inner side surface of a protruding collar or a recess 82, to engage with an outwardly facing screw thread 86 on a cartomizer 30. A screw thread arrangement may be combined with a protrusion extending from the inner surface 73 and configured to extend into the air path aperture 50, if the protrusion is configured to so as not to impede the rotation required to connect the screw threads, and the air path aperture is centrally disposed within the compass of the screw thread on the end of the cartomizer.

Other shapes, forms and configurations of sealing means may also be used, in combination with any of the above examples if desired. The invention is not limited to any particular shape. Rather, any shape may be used that can engage into or around a portion or region of a cartomizer that has within it an air path aperture, so that fluid communication between the interior of the cartomizer via the air path aperture and out to the interior volume of the case is wholly or partially blocked, impeded or restricted.

In some embodiments, the case may have a lid section connected to its other section by a hinge. For a cartomizer with air path apertures at each end (as in FIG. 2), a sealing means according to any of the various examples discussed above may be provided on an inner surface of the case opposite the hinged lid or door, and/or a sealing means according to a "push fit" configuration may be provided on an inner surface of the hinged lid or door.

Figure 10:
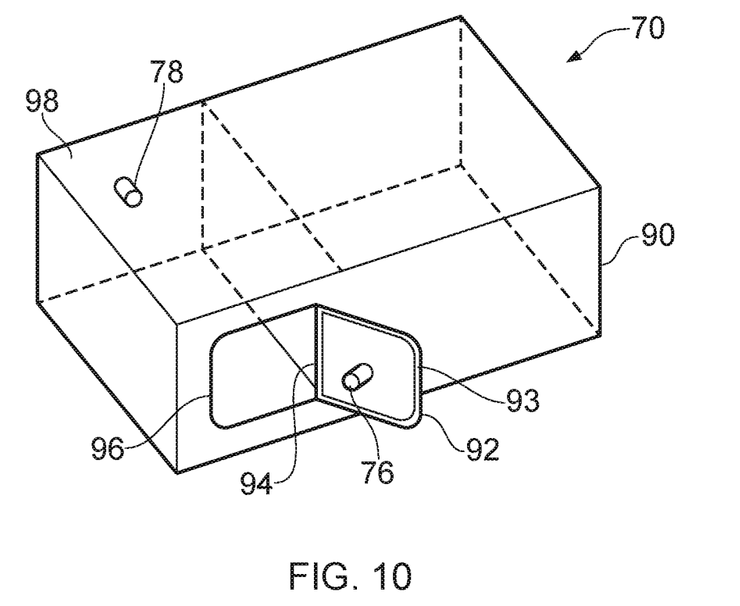
FIG. 10 shows a perspective view of a storage case according to a still further example.

FIG. 10 shows a perspective view of an example case configured in this manner. The case 70 comprises a main body section 90, and a hinged door 92 (or lid) pivotally attached to the main body section 90 by a hinge 94. The main body section 90 has an access opening 96 in one wall, and the door 92 is located so as to close over the access opening 96 when rotated about the hinge 94. A seal 93 may optionally be provided around the perimeter of the door 92 or access opening 96. A cartomizer (not shown) can be inserted into the case 70 through the access opening 96. On an interior surface of a wall 98 of the case 70 opposite to the door 92, there is provided a protruding surface feature sealing member 78 sized and positioned to engage into an air path aperture in a distal end of the inserted cartomizer (the end remote from the door). A second such sealing member 76 is provided on an interior surface of the door 92, so that when the door 92 is closed by rotating it about the hinge 94, the protrusion 76 is inserted into an air path aperture on the proximal end of the cartomizer. The cartomizer is thereby sealed to inhibit leakage at both ends. Although not illustrated, the interior of the case 70 accessible through the access opening 96 may be shaped to correspond or approximate the outer shape of the intended cartomizer, so that when a cartomizer is received in the case 70 it is in an appropriate position for the sealing members 76, 78 in the case to align with the air path apertures in the cartomizer. The case 70 may configured to receive two or more cartomizers, possibly each within a separate region with an individual door giving access to an individual access aperture, or with a single door giving access to a region large enough to accommodate several cartomizers. Arrangements of hinged door or lid other than that illustrated can be envisaged, and the case may be any size or shape. In this example the case has a secondary storage compartment divided from the cartomizer region by an internal wall (accessible via a door, cover or lid, not shown).

The inside of a case in accordance with embodiments of the disclosure may be thought of as comprising two volumes, which have a different relationship in different embodiments. The region of the interior that is intended to be occupied by a cartomizer or cartomizers is a receiving volume, since it receives the cartomizers. The sealing members (one or more per cartomizer) are positioned to align with the air path apertures of a cartomizer received in the receiving volume. Inside walls of the case may be shaped corresponding to part or all of the outer surface of the cartomizer so that the cartomizer is brought into alignment with the sealing members by the action of placing it in the receiving volume and/or closing the case. Alternatively, if a sealing member is configured to engage sufficiently firmly with the portion of the cartomizer having the air flow aperture (for example by a screw thread or friction fit coupling), the sealing member can act also as a support for the cartomizer to hold it in place in the receiving volume.

The sections of the case, such as the first section and the second section of FIGS. 3 to 5, or the main body (second section) and hinged door (first section) of FIG. 10, cooperate to define an interior storage volume for the case (bordered by inside surfaces of the walls of the case). The sections may be connectable or joinable together by a hinge, a screw thread, a push-fit attachment or the like, as already discussed. An aim of the sealing means described herein is to inhibit source liquid from the cartomizer from flowing into the interior storage volume.

In some examples, the receiving volume and the interior storage volume are substantially the same, that is, they are approximately the same size and are coincident and coterminous. The receiving volume occupies substantially the whole of the interior storage volume. Thus, when the case is holding its intended complement of cartomizers, the cartomizers occupy all or nearly all the space inside the case, and the interior storage volume is filled. There is no space to accommodate other items. The cases of FIGS. 3 and 5 are examples of such cases.

In other examples, the interior storage volume is larger than the receiving volume, and the receiving volume is included within the interior storage volume. When the case is holding its intended complement of cartomizers, the receiving volume is fully occupied, but the interior storage volume is not, and may be used to store or hold other, perhaps related, items, such as a battery section for use with the cartomizers to form an electronic cigarette.

Figure 11:
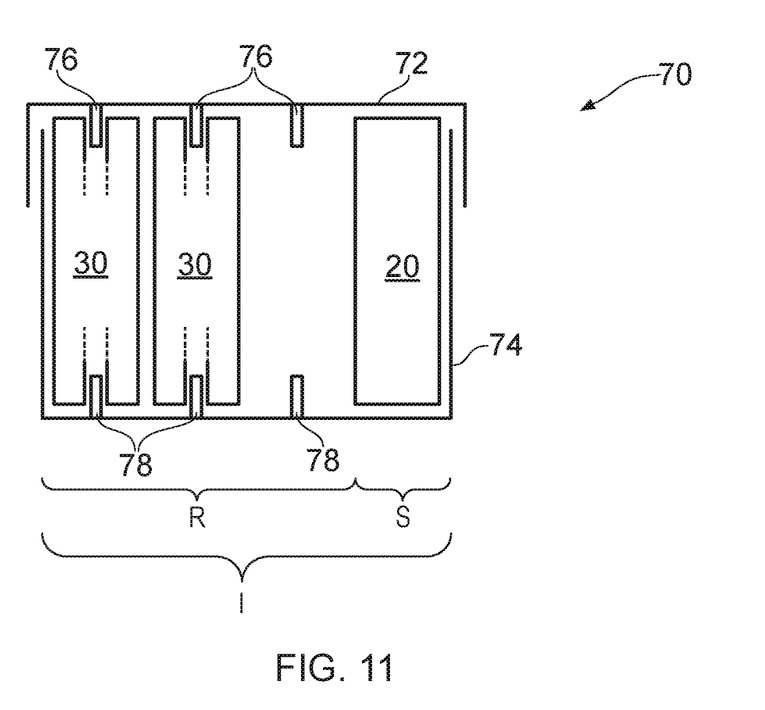
FIG. 11 shows a cross-sectional view of a storage case according an example including an additional storage space.

FIG. 11 shows a cross-sectional view of an example of a case with an enlarged interior storage volume. The case 70 comprises a lid section 72 closable over a base section 74 to define the interior storage volume of the case. This has width I as depicted. The case is provided with three sets of sealing means 76, 78 similar to those of FIG. 4 so can receive three cartomizers in a receiving volume of width R, which is less than the width I of the interior storage volume. Two cartomizers 30 are shown, and there is space to receive a third within the receiving volume. The space by which the interior storage volume exceeds the receiving volume is an additional storage space or volume, of width S. This volume is used in this example to store a battery section 20, which can be coupled to any of the cartomizers to form an electronic cigarette. This is an example configuration only, and the receiving volume might be arranged anywhere within the interior storage volume, any form of sealing means may be used, any number of cartomizers may be accommodated, and items in addition to or instead of the battery section may be received in the storage volume.

In still further embodiments, the receiving volume is adjacent to the interior storage volume, and the two do no overlap, although they are connected via an access opening giving access to the receiving volume from the interior storage volume. In such an arrangement, unwanted leakage of fluid into the interior storage volume from a stored cartomizer can be addressed by a sealing means in the form of a cover closing the access opening. Any liquid that leaks from the cartomizer is thereby restricted to the receiving volume and inhibited from reaching the interior storage volume. Any items in the interior storage volume, such as a battery section, can thereby be protected.

Figure 12:
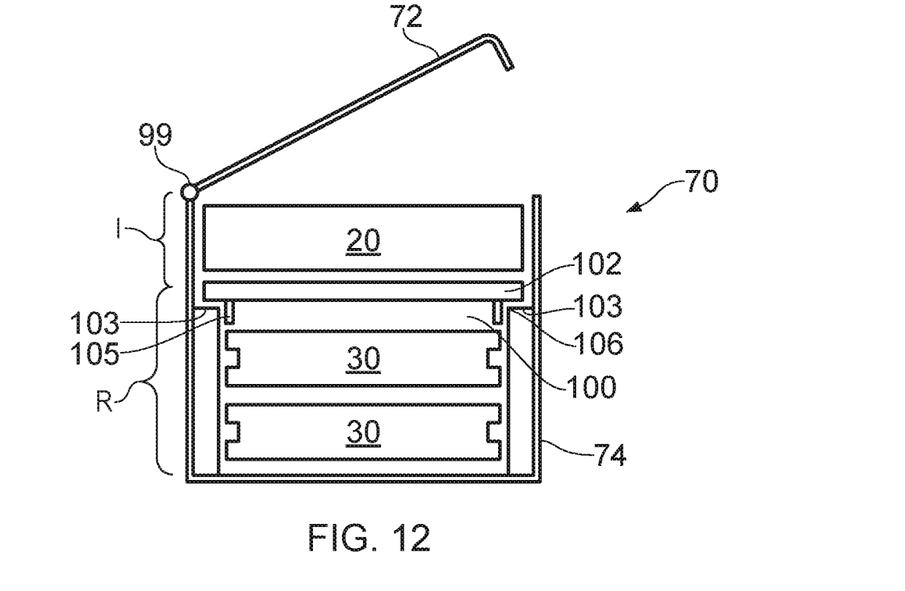
FIG. 12 shows a cross-sectional view of a storage case according to an example with an alternative sealing arrangement

FIG. 12 shows an example of such a case, in cross-section. The case 70 comprises a base section 74 and a lid section 72 that is hingedly attached to the base section 74 at a hinge (any closure or coupling arrangement may be used to secure the lid and base). The volume inside the case 70 is divided into a receiving volume R at the lower part, and an interior storage volume I above the receiving volume R. An access aperture 100 is formed in a partition 103 between the two volumes; the receiving volume R can be accessed from the interior storage volume I through the access aperture 100. The receiving volume R is sized to receive two cartomizers 30 in this example; other cases may hold more or fewer cartomizers. A sealing means 102 comprises a cover that fits across the access aperture 100 to close the receiving volume. The interior storage volume lies in the space above the cover 102 and below the lid 72 (when the case is in a vertical orientation such as illustrated), and can accommodate a battery section 20 for use with the cartomizers 30. The cover 102 has a peripheral flange 105 extending towards the receiving volume R, which engages with the rim 106 of the access aperture 100 to secure the cover 102 in its closed position. The cover 102, flange 105 and rim 106 can be shaped and formed for a friction fit, providing a tight close fit between the cover 102 and the rim 106 to inhibit the passage of liquid. For example, at least the flange 105 and possibly the whole cover 102 may be made from a resilient material (rubber, foam, flexible plastics or similar) providing some elastic deformation allowing the cover 102 to be forced into the aperture 100 under compression. Configurations other than a protruding flange may alternatively be used to provide a friction fit. Alternative closure techniques may employed to hold the cover in place. For example, the cover 102 and the rim 106 may have cooperating screw threads which can be engaged to close the cover. Magnetic materials might be arranged on the cover and the rim, or used to make these components, to secure the cover by magnetic force. As an alternative to a removable cover, the cover 102 might be hinged so that it is rotatably attached to the partition 103 by a hinge (a friction fit or a magnetic arrangement may be used together with a hinge, for example); this will prevent the cover from being mislaid. Alternatively, the cover might be configured in a sliding arrangement, for example with opposite parallel edges of the cover disposed in a pair of tracks on the partition or on interior side walls of the case that allow the cover to slide between an open position giving access to the receiving volume and a closed position separating the receiving volume from the interior storage volume.

The case of FIG. 12 is an example configuration only. The receiving volume and the interior storage volume may be arranged in any desired relative position, and respectively sized to store more or fewer items. The interior surfaces may be shaped to retain the cartomizers and other items in defined positions and locations.

Additionally, if the receiving volume of the case is configured to receive a cartomizer in a position in which an air path aperture is accessible through the access aperture, for example if the cartomizer has an air path aperture on its end surface and is positioned with its longitudinal axis orthogonal to the closed cover, the underside of the lid may be provided with a push-fit sealing means to engage with the air path aperture and provide an additional sealing or leak-inhibiting effect. For example, the cover might be configured similarly to the first section 72 in the FIG. 4 example, or the hinged door in the FIG. 10 example.

Cases according to embodiments of the disclosure may further be configured to include a capability to charge a rechargeable battery or cell inside a battery section of an electronic cigarette stored in the case. This is applicable to cases in which the interior storage volume includes and exceeds the receiving volume, or is adjacent to the interior storage volume, i.e. cases configured to provide storage capacity for an item or items additional to the cartomizers, where the item or items includes a battery section (the body 20 in the example device in FIG. 1). In such examples, the sealing means provides a function of protecting electrical connectors necessary for charging from exposure to leaking source fluid from a cartomizer.

Figure 13:
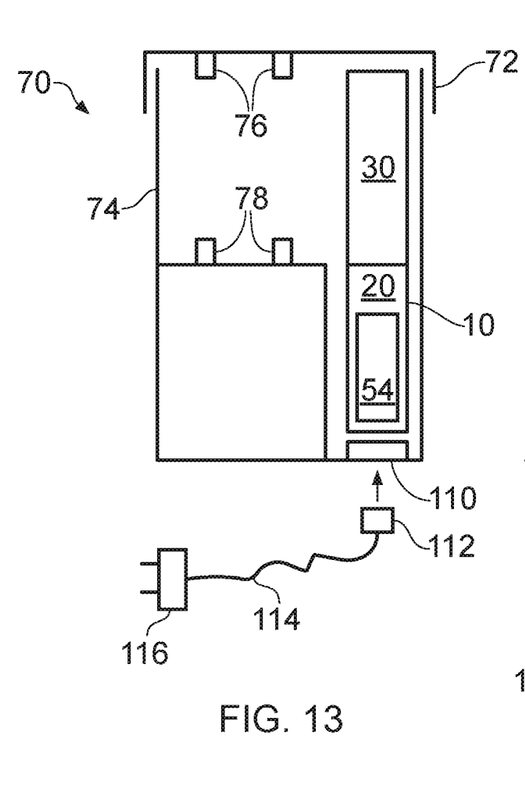
FIG. 13 shows a cross-sectional view of a first example storage case with a battery charging capability.

FIG. 13 shows a simplified cross-sectional view of an example case configured according to such an embodiment. The case 70, having a lid section 72 closing a main section 74, is configured to hold two cartomizers (not shown) in a receiving volume. Sealing means in the form of two protruding surface features 76, 78 for each cartomizer, one to engage with an air inlet and one to engage in an air outlet, are provided in the receiving volume. These features are located inside the lid section 72 and inside the main body 74, similarly to the FIG. 11 example. Adjacent the receiving volume is a storage space comprised within that part of the interior storage volume of the case 70 which exceeds the receiving volume, and this is shaped and dimensioned to receive an electronic cigarette 10 comprising a battery section or body 20 coupled to a cartomizer 30. This example is configured for storage of a complete electronic cigarette 10, whereas other examples may have a storage space configured to accommodate a battery section 20 only. A charging port 110 is provided within the main section 74 of the case 70 in the storage space, and the battery section 20 when inserted into the case 70 can be electrically coupled to this port 110 in any convenient manner to provide an electrical connection (not shown) to a battery or cell 54 within the battery section. The charging port 110 has an external electrical socket accessible from the exterior of the case 70, to which an electrical connector 112 may be coupled for connection via a cable 114 and plug, USB connector 116 (not to scale) or similar to an source of electrical current which can charge the battery 54. The current source may be a mains electrical supply or a host computer, for example. The case therefore functions as a charging unit, operable to connect a battery section 20 to an electrical supply for charging.

Alternatively, a case may be configured as a self-contained charging unit, operable to charge a battery stored in a battery section without connection to an electrical supply.

Figure 14:
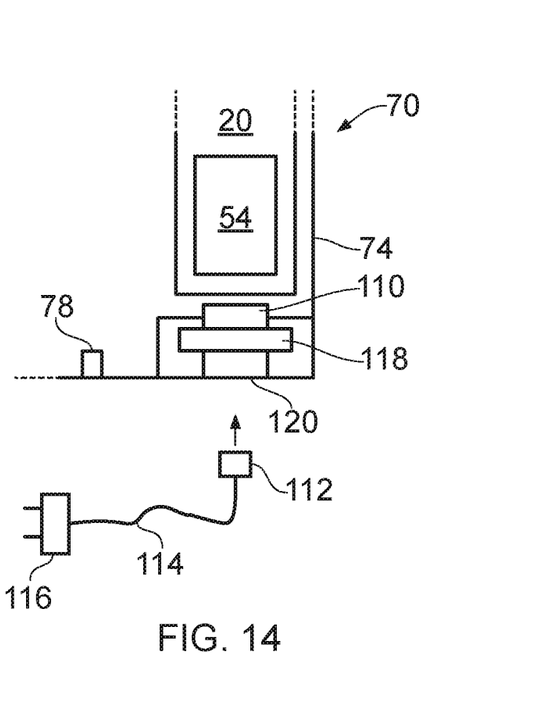
FIG. 14 shows a cross-sectional view of part of a second example storage case with a battery charging capability.

FIG. 14 shows a simplified cross-sectional view of part of an example case configured to self-contained charging. The Figure shows that part of the case 70 which embodies the charging capability. Hence, part of a storage space for housing a battery section 20 is shown, with part of an adjacent receiving volume having a surface feature sealing means 78 protruding from an inner wall. The case comprises a charging port 110 inside the main section 74 of the case as before, but in this instance a rechargeable power source 118 (battery or cell) is interposed between the charging port 110 and the external electrical socket 120. A cable 114 connected to the external socket 120 by a connector 112 can provide electrical current from mains or the like to the rechargeable power source 118 to charge it. When the cable is disconnected, the case can be carried away from the original current source (mains), and used for subsequent charging of a battery section 20 remote from any mains electrical supply or similar. A battery section 20 placed in the case 70 and coupled to the charging port 110 can draw current from the rechargeable power source 118 so that the battery 54 is recharged. The case 70 can also be used for charging of the battery directly from a mains supply similarly to the case of FIG. 13.

Cases having with a charging function may be configured with the appropriate electrical connections configured in any conventional manner understood by the skilled person. Direct electrical connections may be employed, or inductive coupling might be used. The charging port 110 may be configured to connect with a dedicated charging connector on the battery section, or with the electrical connectors provided on the battery section for connecting to a cartomizer, depending on the format of the battery section. The case may accommodate any number of cartomizers in its receiving volume, and any of the various sealing means discussed herein may be used to inhibit leakage of liquid from the cartomizer(s). Also, the storage space may be sized to accommodate one or more additional battery sections in addition to a battery section in a position for coupling to the charging port.

Figure 15:
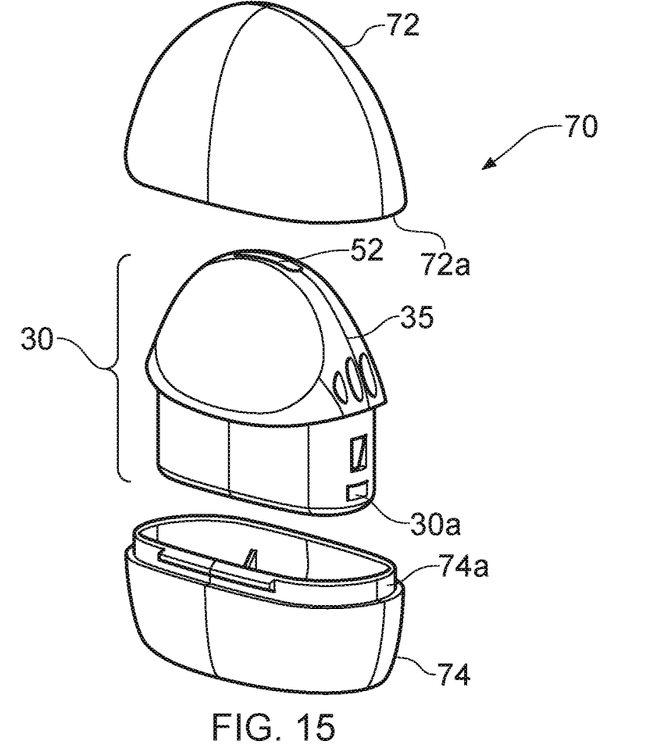
FIG. 15 shows an exploded exterior view of a further example storage case and an example cartomizer that may be stored in the case.

FIG. 15 shows an exploded external perspective view of a further example storage case or container, together with a cartomizer which it is intended to contain. Usefully in this example, the case 70 may be configured as packaging for supply of the cartomizer 30 to a consumer, and may further be configured for extended use to store the cartomizer after receipt by the consumer, for example by being sufficiently robust to withstand repeated opening and closing, and removal and insertion of the cartomizer. As an example, the two parts of the case 70 may be formed from polypropylene (for example by molding, either in single sections, or in multiple sections which are joined together by welding, adhesive or snap fitting of connecting parts); other materials are not precluded, however. One or both parts might be formed from a transparent material to allow observation of the contents of the case, for example to allow identification of a cartomizer that may have a particular color indicating a source liquid flavor.

The FIG. 15 example is similar to the FIG. 3 example, differing principally by its shape and overall appearance. The case 70 comprises a first section 72, having the function of a lid or top housing portion, and a second section 74 having the function of a base or bottom housing portion. The first and second sections 72, 74 engage together at joining portions 72a, 74a defined on the facing edges of the two sections. In this example, engaging shapes enable a snap-fit connection so that the case 70 can be closed by pushing the two sections together, and opened by pulling the two sections apart. The two sections 72, 74 define an interior storage volume of the case, which is shaped to receive and accommodate a single cartomizer 30. The cartomizer 30 in this example has a flattened shape, with a width similar to its height, and a depth much less than this. This is in contrast to the elongate and generally cylindrical shape of the cartomizer 30 in the FIG. 3 example. The storage volume is shaped to approximate the exterior shape and size of the cartomizer 30 reasonably closely, so there is little or no empty space inside the closed case 70 when it is holding the cartomizer 30. The cartomizer has a mouthpiece part 35 in which an air outlet (air path aperture) of the cartomizer 30 is defined. An air inlet (second air path aperture, not shown in FIG. 15) for the cartomizer 30 is located in a bottom face 30a of the cartomizer.

Figure 16:
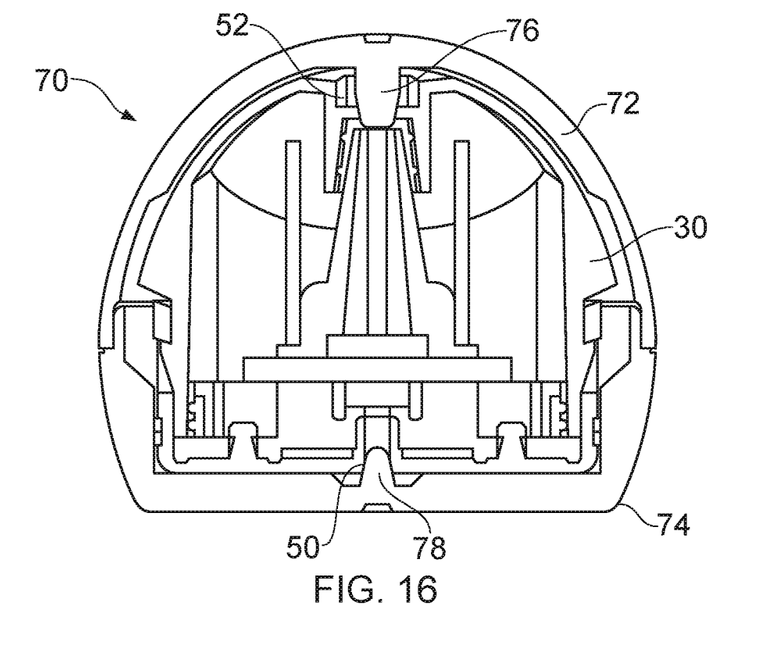
FIG. 16 shows a cross-sectional view through the storage case of FIG. 15 in a closed configuration accommodating the example cartomizer.

FIG. 16 shows a cross-sectional view of the case 70 in a closed configuration storing the cartomizer 30 in its interior volume. Note that the cartomizer 30 is also shown in cross-section, but its internal structure is merely an example and is not relevant to the present disclosure. As can be seen, the interior volume of the case 70 closely matches the exterior shape of the cartomizer. This view shows a first sealing means 76 arranged inside the first section 72 and a second sealing means 78 arranged inside the second section 74. Each sealing means 76, 78 has the form of a protrusion extending from an interior wall of the case 70, into the interior of the case. The first sealing means 76 is positioned to align with the air path aperture 52 in the cartomizer mouthpiece 35, and the second sealing means 78 is arranged to align with the air path aperture 50 in the bottom face of the cartomizer 30. When the first and section sections 72, 74 are joined to close the case around the cartomizer 30, each sealing means 76, 78 reaches into its corresponding air path aperture 50, 52 to plug it, and inhibit fluid leakage therefrom. Each sealing means 76, 78 has a tapering shape so that its width is less at the end remote from the case wall; this facilitates entry of the sealing means into the air path aperture. Otherwise, each sealing means has a cross-section orthogonal to its length which is sized and shaped to match the transverse shape of the corresponding air flow path, to provide a close fit for effective sealing. In this example, the second sealing means has a substantially circular cross-section since the lower air flow aperture 50 is circular, and the first sealing means has a substantially oval cross-section since the mouthpiece aperture 52 is oval, mirroring the flattened profile of the cartomizer, with its width greater than its depth.

Figure 17:
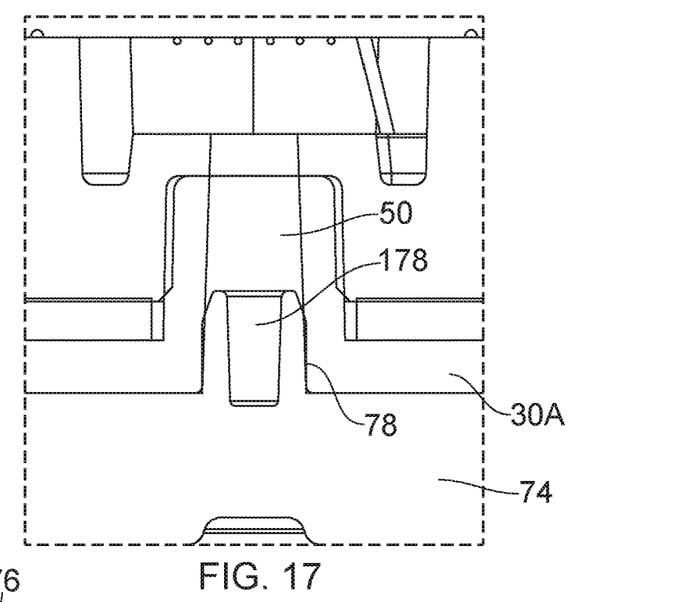
FIG. 17 shows a cross-section of a detail of one end of a storage case accommodating a cartomizer.

FIG. 17 shows a detail of the sealing means according to some embodiments. In particular, FIG. 17 is a cross-section through the bottom section of the case 74, and also through the bottom portion of a cartomizer located in the case. The bottom section of the case 74 includes a protrusion 78 that is inserted into an airflow aperture 50 formed in the bottom face 30A of the cartomizer 30. The protrusion, which forms a sealing means, is generally in the shape of a collar having a central space 178, which is open at the top end (the end inserted furthest into the cartomizer). However, unlike in FIG. 6a, this collar fits inside the aperture 50, contacting the wall of the aperture in order to form a seal. One reason for having such a central space 178 in protrusion 78 is to assist with molding the case. In addition, the central space 178 may provide the protrusion 78 with some resilience to form a better seal (allowing the protrusion 78 to be under slight compression within the aperture 50).

Figure 18A:
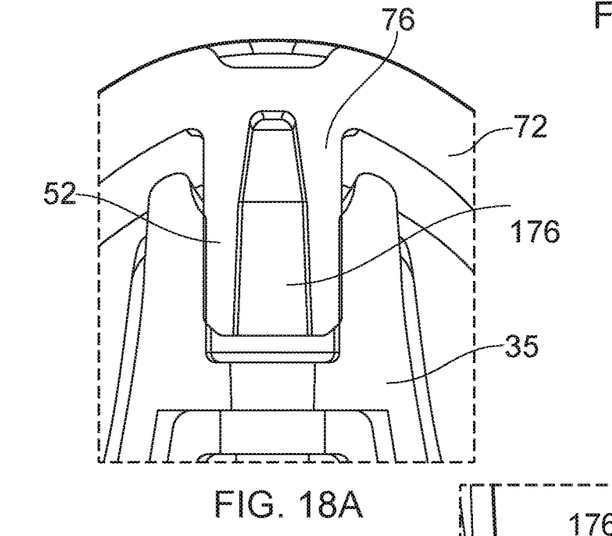
FIG. 18A shows a cross-section of a detail of one end of a storage case (opposite to that of FIG. 17) accommodating a cartomizer.
Figure 18B:
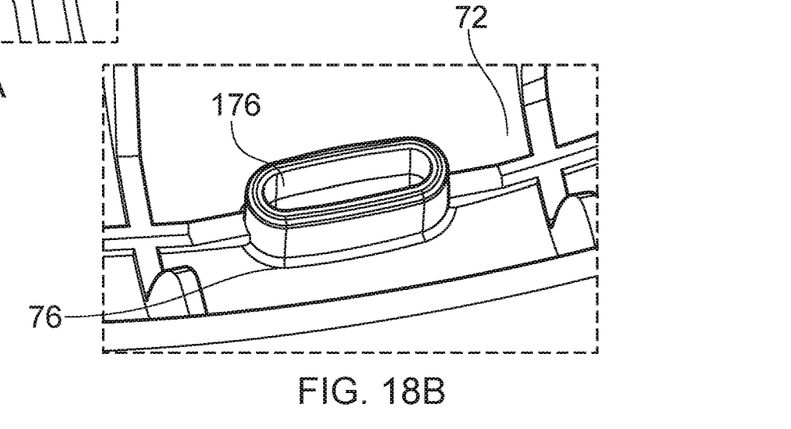
FIG. 18B shows a view of this same end, but without the cartomizer present.

FIGS. 18A and 18B show a detail of the sealing means according to some embodiments. In particular, FIG. 18A is a cross-section through the top section of the case 72, and also through the top (mouthpiece portion) of a cartomizer located in the case. The top section of the case 72 includes a protrusion 76 that is inserted into the airflow aperture (mouthpiece hole) 52 formed at the top of the cartomizer 30. The protrusion, which forms a sealing means, is in generally in the shape of an oval collar having a central space 176 which is open at the bottom (the end inserted furthest into the cartomizer). Again, this collar sits inside the aperture 52, contacting the wall of the aperture in order to form a seal. FIG. 18B is a view inside the top section of the case 72 without the cartomizer present, showing the overall shape of the protrusion 76, which is in the form of a raised ridge or wall having an oval shape (or any other suitable shape) that defines a space 176 within the central region of the protrusion.

The surface feature sealing means in the embodiments discussed thus far have been in general positioned within a case and shaped so as engage with air path apertures on end walls of a cartomizer. However, embodiments of the disclosure are not so limited, and surface features may be shaped and positioned to engage with apertures in other locations on a cartomizer, such as openings in a cartomizer side wall.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A storage case for an electronic vapor provision device component, the storage case defining an interior storage volume and comprising:
   a receiving volume configured to receive at least one electronic vapor provision device component within the storage case, the at least one electronic vapor provision device component having a reservoir for source liquid; and
   the storage case comprising at least one sealing member configured to inhibit liquid held in the reservoir of the at least one electronic vapor provision device component received in the receiving volume from leaking out of the electronic vapor provision device component, wherein the at least one electronic vapor provision device component is detached from a body section of an electronic vapor provision device when received within the storage case.

2. A storage case according to claim 1, wherein the at least one electronic vapor provision device component is a cartomizer.

3. A storage case according to claim 1, wherein the at least one electronic vapor provision device component is a source liquid cartridge for insertion into a cartomizer.

4. A storage case according to claim 1, wherein the at least one sealing member comprises a surface feature on an interior surface of the storage case configured to engage with a portion of a component including an air path aperture to inhibit the egress of liquid from the air path aperture.

5. A storage case according to claim 4, wherein the surface feature comprises a protrusion configured to extend into an air path aperture when engaged with the component portion.

6. A storage case according to claim 4, wherein the surface feature comprises a protrusion configured to cover an air path aperture when engaged with the component portion.

7. A storage case according to claim 4, wherein the surface feature comprises a collar configured to engage a perimeter of the component portion around the air path aperture.

8. A storage case according to claim 7, wherein the surface feature is a recess in the interior surface of the storage case, a wall of the recess forming the collar.

9. A storage case according to claim 7, wherein the surface feature is a collar formation protruding from the interior surface of the storage case.

10. A storage case according to claim 4, wherein the surface feature is configured to be elastically deformable to provide a friction or compression fit with or against the component portion.

11. A storage case according to claim 4, wherein the surface feature comprises a screw thread configured to engage with a cooperating screw thread on the at least one electronic vapor provision device component.

12. A storage case according to claim 2, wherein the at least one sealing member comprises a first sealing member configured to engage a portion of the at least one electronic vapor provision device component including an air inlet of the at least one electronic vapor provision device component and a second sealing member configured to engage a portion of the at least one electronic vapor provision device component including an air outlet of the at least one electronic vapor provision device component.

13. A storage case according to claim 1, wherein the receiving volume occupies the whole of the interior storage volume.

14. A storage case according to claim 1, wherein the interior storage volume includes the receiving volume.

15. A storage case according to claim 1, wherein the receiving volume is adjacent to the interior storage volume.

16. A storage case according to claim 15, wherein the at least one sealing member comprises a cover for closing the receiving volume and separating the receiving volume from the interior storage volume.

17. A storage case according to claim 16, wherein the cover is retainable in a closed position to close the receiving volume by a friction fit, a screw thread connection or a magnetic attachment with a rim of an access aperture of the receiving volume.

18. A storage case according to claim 1, wherein the interior storage volume is configured to accommodate at least one battery section of an electronic vapor provision device.

19. A storage case according to claim 18, further comprising an electrical connection to connect an accommodated battery section to a charging device.

20. A storage case according to claim 19, wherein the charging device is integral with the storage case.

21. A storage case according to claim 1, wherein the storage case comprises a first section and a second section connectable together by a closure arrangement so as to define the interior storage volume.

22. A storage case according to claim 1, further comprising at least one electronic vapor provision device component received in the receiving volume.

23. A storage case for an electronic vapor provision device component, the storage case defining an interior storage volume for storing one or more components of an electronic vapor provision device, and comprising:
a receiving volume configured to receive at least one electronic vapor provision device component within the storage case, the at least one electronic vapor provision device component having a reservoir for source liquid; and
the storage case comprising at least one sealing member configured to inhibit liquid held in the reservoir of the at least one electronic vapor provision device component received in the receiving volume from leaking out of the electronic vapor provision device component and flowing into the interior storage volume so as to protect stored components from liquid exposure,
wherein the at least one electronic vapor provision device component is detached from a body section of an electronic vapor provision device when received within the storage case.

24. A storage case according to claim 1, wherein the at least one sealing member is configured to engage with the at least one electronic vapor provision device component so as to inhibit liquid held in the reservoir of the at least one electronic vapor provision device component received in the receiving volume from leaking out of the electronic vapor provision device component.

25. A storage case according to claim 1, wherein the at least one sealing member is configured to inhibit liquid held in the reservoir of the at least one electronic vapor provision device component received in the receiving volume from leaking out of one or more apertures of an air flow path of the electronic vapor provision device component.

* * * * *